United States Patent
Wang (10) Patent No.: US 7,021,638 B2
(45) Date of Patent: *Apr. 4, 2006

(54) SAFETY DRIVING ARRANGEMENT FOR TWIST VEHICLE

(76) Inventor: Jar Chen Wang, 16320 Bloomfield Ave., Cerritors, CA (US) 90703

( * ) Notice: Subject to any disclaimer, the term of this patent is extended or adjusted under 35 U.S.C. 154(b) by 0 days.

This patent is subject to a terminal disclaimer.

(21) Appl. No.: 10/940,106

(22) Filed: Sep. 13, 2004

(65) Prior Publication Data

US 2005/0029765 A1    Feb. 10, 2005

Related U.S. Application Data

(62) Division of application No. 10/313,584, filed on Dec. 9, 2002, now Pat. No. 6,860,497.

(51) Int. Cl.
  *B62M 1/00*    (2006.01)
(52) U.S. Cl. .............................. 280/87.021; 280/87.051
(58) Field of Classification Search .......... 280/87.021, 280/87.01, 87.051, 87.042, 87.041, 210, 280/211, 240, 218, 242.1, 21.1; 180/218, 180/65.1; D21/433, 424; 446/463, 424
  See application file for complete search history.

(56) References Cited

U.S. PATENT DOCUMENTS

| | | | | |
|---|---|---|---|---|
| 6,386,304 B1 * | 5/2002 | Wang | ..................... | 180/65.1 |
| 6,431,566 B1 * | 8/2002 | Gu | ..................... | 280/87.021 |
| 6,464,029 B1 * | 10/2002 | Gu | ..................... | 446/463 |
| 6,494,470 B1 * | 12/2002 | Chang | ..................... | 280/87.041 |
| 6,499,755 B1 * | 12/2002 | Gu | ..................... | 280/210 |
| 6,502,843 B1 * | 1/2003 | Gu | ..................... | 280/218 |
| 6,561,534 B1 * | 5/2003 | Gu | ..................... | 280/242.1 |
| 6,634,662 B1 * | 10/2003 | Gu | ..................... | 280/218 |
| 6,641,456 B1 * | 11/2003 | Wang | ..................... | 280/87.021 |
| 6,712,167 B1 * | 3/2004 | Gu | ..................... | 280/218 |
| 6,722,674 B1 * | 4/2004 | Gu et al. | ..................... | 280/87.021 |
| 6,860,497 B1 * | 3/2005 | Wang | ..................... | 280/87.021 |
| 6,874,587 B1 * | 4/2005 | Wang | ..................... | 280/218 |
| 6,875,158 B1 * | 4/2005 | Wang | ..................... | 280/87.021 |

* cited by examiner

*Primary Examiner*—Hau Phan
(74) *Attorney, Agent, or Firm*—Raymond Y. Chan; David & Raymond (57) ABSTRACT

A twist vehicle includes a vehicle frame, a driving system, and a safety driving arrangement. The driving system includes a transmission member, having an upper portion connected to a steering member, rotatably supported by the vehicle frame. The safety driving arrangement includes a twisting member connected to a lower portion of the transmission member, a driving wheel assembly rotatably connected to two rear side portions of the twisting member, and a front stabilizing wheel rotatably and suspendedly supported at a front portion of the vehicle frame with a safety distance between the safety wheel assembly and the lower portion of said transmission member, so as to prevent the twist vehicle from flipping over when the twist vehicle is moving.

10 Claims, 5 Drawing Sheets

SAFETY DRIVING ARRANGEMENT FOR TWIST VEHICLE

CROSS REFERENCE OF RELATED APPLICATION

This is a divisional application of a non-provisional application having an application Ser. No. 10/313,584 and a filing date of Dec. 9, 2002 now U.S. Pat. No. 5,860,497.

BACKGROUND OF THE PRESENT INVENTION

1. Field of Invention

The present invention relates to a vehicle, and more particularly to a twist vehicle incorporated with a safety driving arrangement which is capable of enhancing general stability of the twist vehicle while it is moving.

2. Description of Related Arts

Conventional twist vehicles have provided people, and especially children, an opportunity to entertain and do reasonable amount of exercise at the same time. Thus, they become more and more popular in the marketplace.

Figure 1:
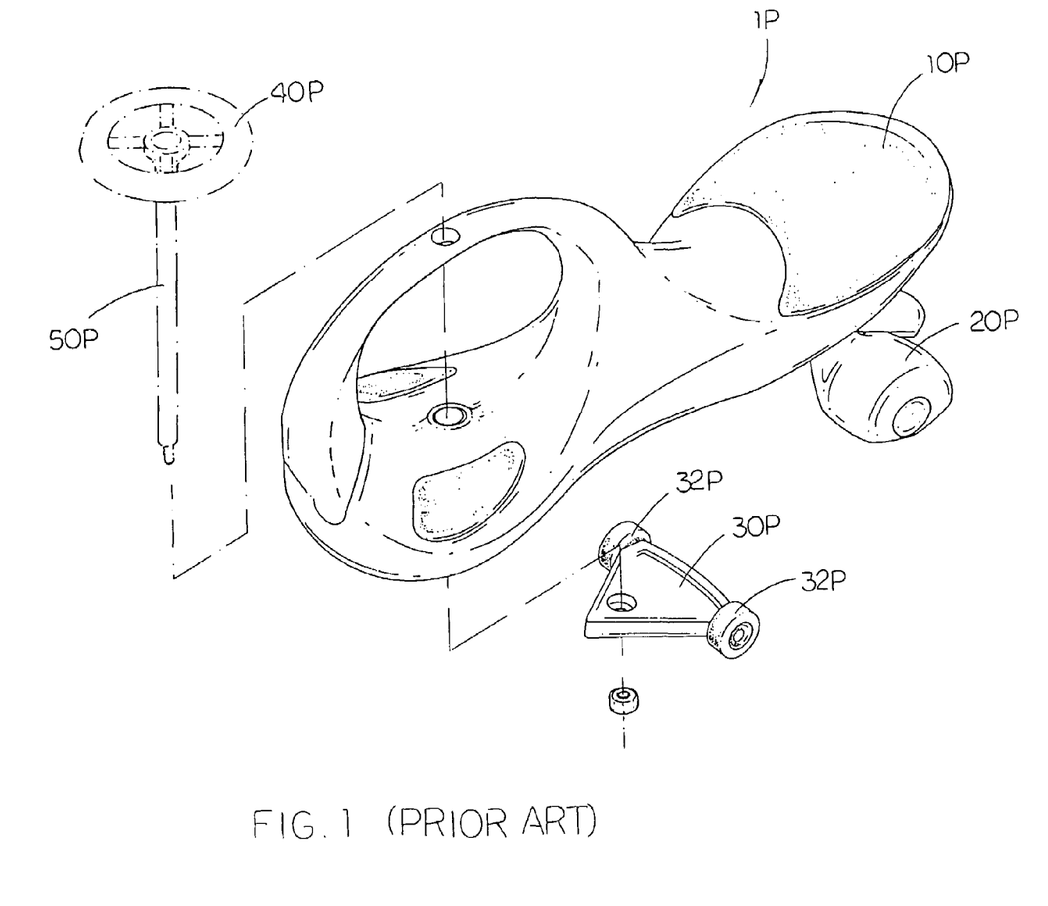
FIG. 1 is a perspective view of a conventional twist vehicle.

Referring to FIG. 1 of the drawings, a conventional twist vehicle 1P usually comprises a vehicle frame 10P, a rear wheel assembly 20P rotatably mounted on a rear portion of the vehicle frame 10P, a triangular twisting member 30P, a pair of driving wheels 32P rotatably and spacedly mounted on two corner portions of the twisting member 30P respectively, a steering member 40P rotatably provided on the vehicle frame 10P for driving and controlling the twist vehicle to move in a particular desirable direction, and a connecting member 50P which has a upper controlling end connected to the steering member 33P, and a lower driving end connected to a front corner portion of the twisting member 30P. Whereby, when twisting motions—subsequent clockwise and anti-clockwise movement are imparted to the steering member such as that imparted by a rider of the twist vehicle 1P, the twisting motions will be transmitted to the twisting member 30P via the connecting member 50P, and as a result, the twisting member 30P rotates accordingly about the connecting member 50P. The driving wheels 32P then drive the twist vehicle 1P to move.

Very often, a supporting wheel is rotatably mounted on the front corner portion of the twisting member 30P for supporting the twisting member 30P while the twist vehicle 1P is moving.

One skilled in the art should appreciate that the major reason which makes the twist vehicle to move hinges upon the geometrical arrangement of the driving wheels 32P. Specifically, the pair of driving wheels 32P must be spacedly apart from each other and that each of the driving wheels 32P must be spacedly apart from the axis of twisting, i.e. the corner portion of the twisting member 30P, or the supporting wheel. These geometrical constraints must be satisfied to ensure the twist vehicle's 'enablement'.

Due to the above geometrical constraints, the twisting member 30P of the conventional twist vehicle 1P is therefore triangular in shape, wherein the pair of driving wheels 32P is mounted at two rear corners of the twisting member 30P, while the supporting wheel is mounted in front of the driving wheels 32P. As a result, the axis of rotation while the twisting member 30P is being twisted is not coincident with the center of gravity of the triangular twisting member 30P. As a matter of fact, as the axis of rotation is shifted a little bit forward as compared with the center of gravity of the twisting member 30P, the rider may lose balance easily while driving and the whole twist vehicle may flip over. Besides, it is the triangular twisting member 30P that lacks supporting strength (because of its shape) to substantially support the twist vehicle.

Moreover, conventional twist vehicles 1P suffer a pressing disadvantage of being unstable while moving. As stated above, the moving of the twist vehicle 1P is essentially driven by the twisting of the twisting member 30P, caused by the twisting of the steering member 40P. Therefore, the inherent structure and operation principle of conventional twist vehicle 1P induces its own instability.

On the other hand, it is expected that most of the riders of conventional twist vehicles 1P are children whose ability to balance themselves and control the twist vehicle are limited. Thus, when a child is riding the twist vehicle 1P, due to its inherent instability, the whole vehicle may be flipped over, as reasoned above. This is particularly true when the vehicle is turning around. The child involved may be knocked down on the ground in which the vehicle moved on. The consequence of such incident can be disastrous. In view of the above, anyone skilled in the art cannot simply afford to ignore the safety issue of the twist vehicle 1P.

SUMMARY OF THE PRESENT INVENTION

A main object of the present invention is to provide a safety driving arrangement for a twist vehicle which can substantially enhance the operational stability of the twist vehicle so as to provide maximum safety to the vehicle's rider.

Another object of the present invention is to provide a safety driving arrangement for a twist vehicle which comprises a twisting member having increased supporting surface area as compared with conventional twist vehicle, as a result, the supporting strength of the twisting member can be maximized.

Another object of the present invention is to provide a safety driving arrangement for a twist vehicle wherein the axis of rotation of its twisting member is arranged to substantially coincide with the center of gravity thereof, so that maximum support from the twisting member can be derived, ensuring maximum stability of the twist vehicle while moving.

Another object of the present invention is to provide a safety driving arrangement for a twist vehicle which comprises a stabilizing wheel assembly to provide enhanced support to the twist vehicle, especially when the twist vehicle is turning around.

Another object of the present invention is to provide a safety driving arrangement for a twist vehicle which does not require to significantly alert the original design of the twist vehicle.

Another object of the present invention is to provide a safety driving arrangement for a twist vehicle which does not involve complicated or expensive mechanical components so as to minimize the manufacturing and any related costs of the twist vehicle and the safety driving arrangement.

Accordingly, in order to accomplish the above objects, the present invention provides a twist vehicle, comprising:

a vehicle frame;

a rear wheel assembly rotatably mounted on a rear portion of the vehicle frame;

a driving system, which comprises:

a transmission member rotatably supported by the vehicle frame wherein the transmission member has a upper control portion positioned above the vehicle frame and a lower driving portion extended underneath the vehicle frame; and a steering member which is connected to the control portion of the transmission member and arranged to drive the driving portion of the transmission member to rotate; and a safety driving arrangement, which comprises:

a twisting member, having a predetermined shape, mounted on the driving portion of the transmission member;

two spaced apart driving wheels rotatably mounted to the twisting member and defining a driving distance between each driving wheel and the driving portion of the transmission member; in such a manner that when subsequent clockwise and anti-clockwise movements are imparted to the steering member, the two driving wheels are substantially moving forward, so as to drive the vehicle frame to move; and a safety wheel assembly rotatably supported at a front portion of the vehicle frame with a safety distance between the safety wheel assembly and the driving portion of the transmission member, so as to prevent the twist vehicle from flipping over when the twist vehicle is moving.

DETAILED DESCRIPTION OF THE PREFERRED EMBODIMENT

Figure 2:
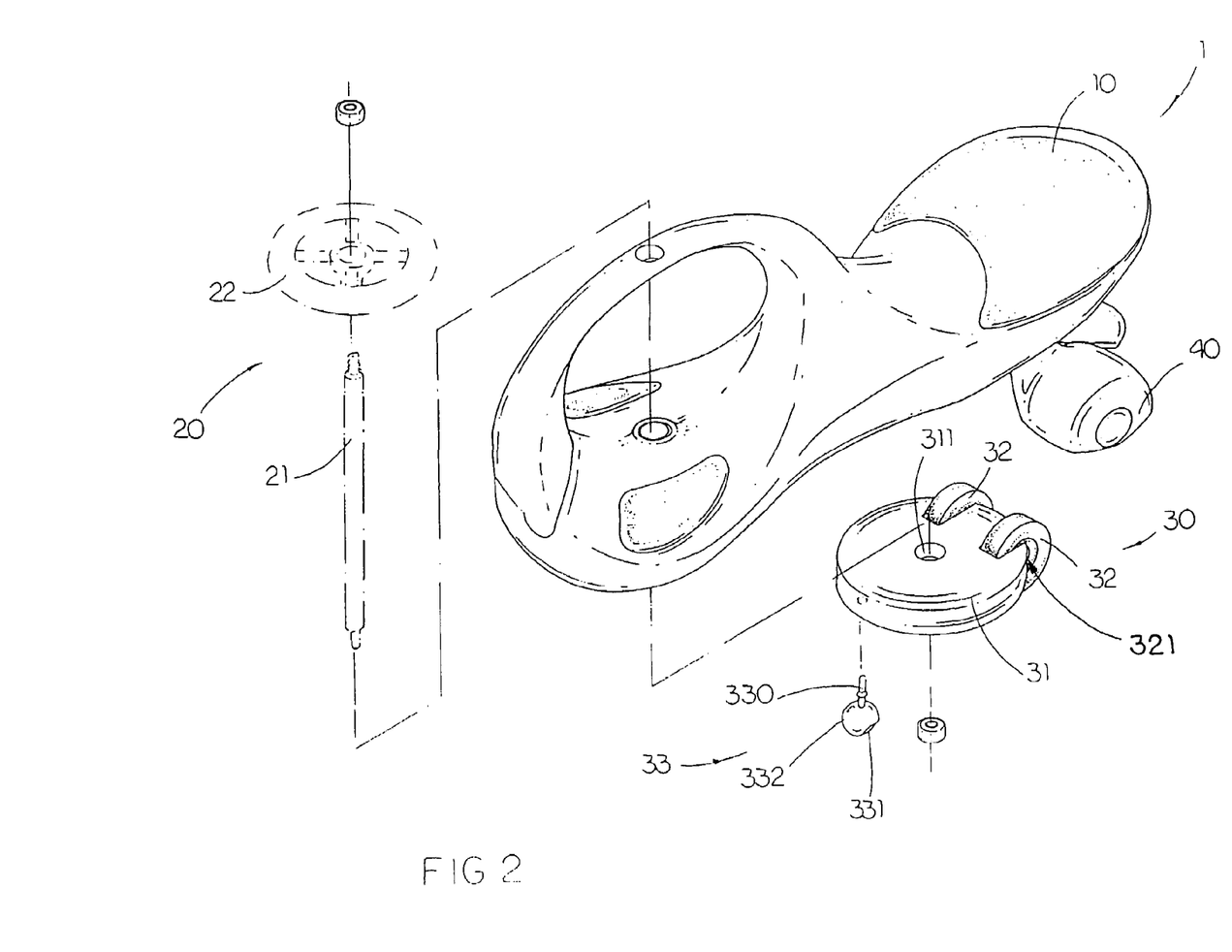
FIG. 2 is an exploded perspective view of a twist vehicle incorporated with a safety driving arrangement according to a first preferred embodiment of the present invention.

Referring to FIG. 2 of the drawings, a twist vehicle 1 incorporated with a safety driving arrangement 30 according to a first preferred embodiment of the present invention is illustrated. According to the first preferred embodiment, the twist vehicle 1 comprises a vehicle frame 10, a driving system 20, and a safety driving arrangement 30.

The driving system 20 comprises a transmission member 21, rotatably supported by the vehicle frame 10, having an upper control portion and a lower driving portion respectively extended above and below the vehicle frame 10 respectively, and a steering member 22 which is connected to the control portion of the transmission member 21 and arranged to drive the driving portion of the transmission member 21 to rotate.

Figure 3:
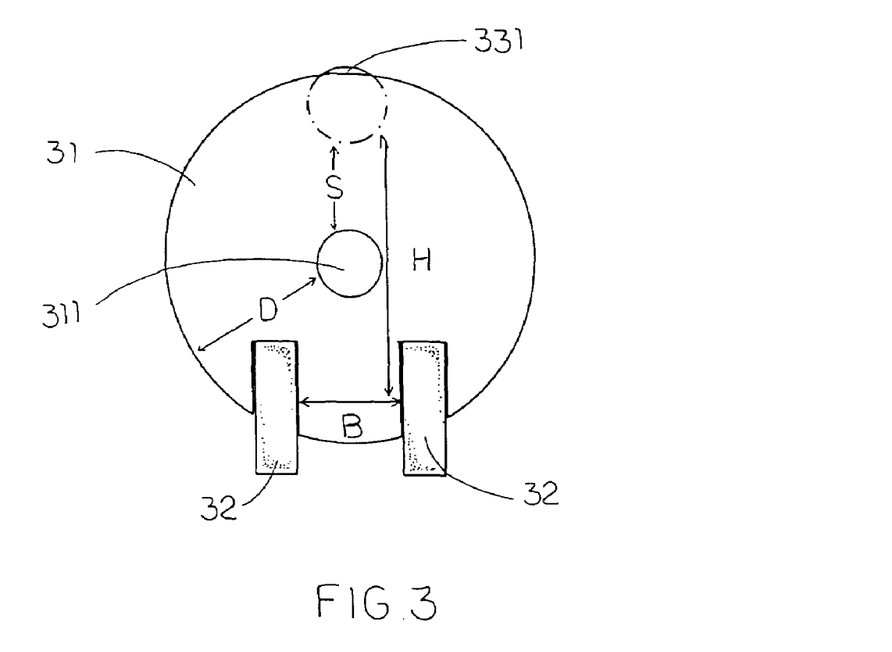
FIG. 3 is a schematic diagram of the twisting member according to the above first preferred embodiment of the present invention.

Referring to FIGS. 2 to 3, the safety driving arrangement 30 comprises a twisting member 31, having a predetermined shape, mounted on the driving portion of the transmission member 21, and two spaced apart driving wheels 32 rotatably mounted to the twisting member 31 and defining a driving distance D between each driving wheel 32 and the driving portion of the transmission member 21, in such a manner that when subsequent clockwise and anti-clockwise movements are imparted to the steering member 22, the two driving wheels 32 are substantially moving forward, so as to drive the twist vehicle 1 to move.

The safety driving arrangement 30 further comprises a safety wheel assembly 33 rotatably supported at a front portion of the vehicle frame 10 with a safety distance S between the safety wheel assembly 33 and the driving portion of the transmission member 21, so as to prevent the twist vehicle 1 from flipping over when the twist vehicle 1 is moving.

According to the preferred embodiment, when subsequent clockwise and anti-clockwise movements are imparted to the steering member 22, twisting motion will be induced at the transmission member 21, so as to drive the twist vehicle 1 to move. Accordingly, the transmission member 21 is essentially a shaft vertically and rotatably supported by the vehicle frame 10 in such a manner that the rotational movement at the control portion of the transmission member 21 is directly transmitting to the driving portion thereof.

Referring to FIGS. 2 to 3 of the drawings, the twisting member 31, having a circular shaped, has a center hub 311 connected to the driving portion of the transmission member 21.

The two driving wheels 32 are spacedly and rotatably mounted at a circumferential edge of the twisting member 31 via a wheel axle 321 to define the driving distance D between each of the driving wheels 32 and the driving portion of the transmission member 21, wherein the driving distance D is the radius of the twisting member 31. Moreover, the two driving wheels 32 are spaced apart with each to define a base length B therebetween so as to drive the twist vehicle 1 forward when the twisting member 31 is driven to be rotated via the steering member 22.

The safety wheel assembly 33 comprises a front stabilizing wheel 331 rotatably mounted at a front portion of the twisting member 31 to define the safety distance S between the front stabilizing wheel 331 and the center of the twist member 31 wherein the safety distance S is defined as a hypotenuse length H between each of the driving wheels 32 and the front stabilizing wheel 331.

The front stabilizing wheel 331 is suspendedly mounted on the twisting member 31 in such a manner that the front stabilizing wheel 331 is normally overhung the ground in which the twist vehicle 1 stands, i.e. the front stabilizing wheel 331 does not normally touch the ground so as to normally get rid of the friction between the front stabilizing wheel 331 and the ground. As a result, during normal operation, the friction between the front stabilizing wheel 331 and the ground ceases to exist and smooth moving of the twist vehicle 1 can be ensured.

The safety wheel assembly 33 further comprises a wheel holder 330, which is rotatably mounted to the twisting member 31, has a wheel housing 332 extended from the wheel holder 330 to rotatably support the front stabilizing wheels 331. Note that the front stabilizing wheel 331 is adapted to move freely, i.e. 360° with respect to the twisting member 31, so as to allow maximum flexibility to substantially prevent the twist vehicle 1 from being unbalance or even flipped over, while unaffecting the operation of the twist vehicle 1.

In other words, the driving wheels 32 are mounted at two circumferential side portions of the twisting member 31, whereas the front stabilizing wheel 331 is mounted on the front circumferential side portion of the twisting member 31. Accordingly, the diameter of the front stabilizing wheel 331 is made to be less than the diameters of the two driving wheels 32 which have the same diameter.

The twist vehicle 1 further comprises a rear wheel assembly 40 rotatably mounted on a rear portion of the vehicle frame 10 so as to rotatably support a rear portion of the twist vehicle 1.

Thus, when subsequent clockwise and anti-clockwise movement are imparted to the steering member 22 to induce the twisting motion of the transmission member 21, the twisting member 31 will rotates about its center accordingly, with the driving wheel assembly 32 driving the twist vehicle 1 to move.

It is worth elaborating that the shape of the twisting member 31 is different from conventional ones, and this feature underpins one of the several subject matters that the present invention possesses. As mentioned above, the twisting member 31 is of circular in shape which is capable of maximizing the supporting area of the twisting member 31 as compared with those conventional triangular twisting members. However, at the same time, the fact that the twisting member 31 is circular in shape does not affect the smooth operation of the twist vehicle 1, in that the driving wheels 32 are arranged to sufficiently position apart from each other and from the front stabilizing wheel 331 at a distance of the base length B and the hypotenuse length H respectively.

In other words, for a given conventional twisting member which is triangular in shape, and has particular base length B and hypotenuse length H which are essentially the distance between the pair of driving wheels 32, and the distance between the front stabilizing wheel 331 and each of the driving wheels 32 respectively, constructing a circular twisting member which has the same base length B and the hypotenuse length H of the driving wheels 32 and the front stabilizing wheel 331 would enhance, if not maximize, the supporting strength of the twisting member 31.

Furthermore, since the transmission member 21 is connected with the twisting member 31 at the center of gravity thereof, maximum supporting strength can be derived from the twisting member 31 and therefore maximum stability of the twist vehicle 1 during operation can be ensured.

One skilled in the art would appreciate that when operating, a rider of the twist vehicle 1 of the present invention will twist the steering member 22 in order to make the vehicle move forwardly. During twisting, the rider may, accidentally yet unavoidably, depress, due to occasional unbalance or otherwise, the steering member 22 and all other interconnected components, such as the transmission member 21 and the twisting member 31. Thus, the front stabilizing wheel 331 acts as a stabilizer to provide sufficient support in such a way that the twist vehicle 1 will not flip over forwardly, while keeping the movement of the twist vehicle 1 intact. In other words, the front stabilizing wheel 331 forms an auxiliary wheel to assist balancing the twist vehicle 1. Note that the front stabilizing wheel 331 would not normally touch the ground unless unbalancing of the rider happens. Thus, any negative effect, such as increased friction, as demonstrated by the front stabilizing wheel 331 can be minimized.

Figure 4:
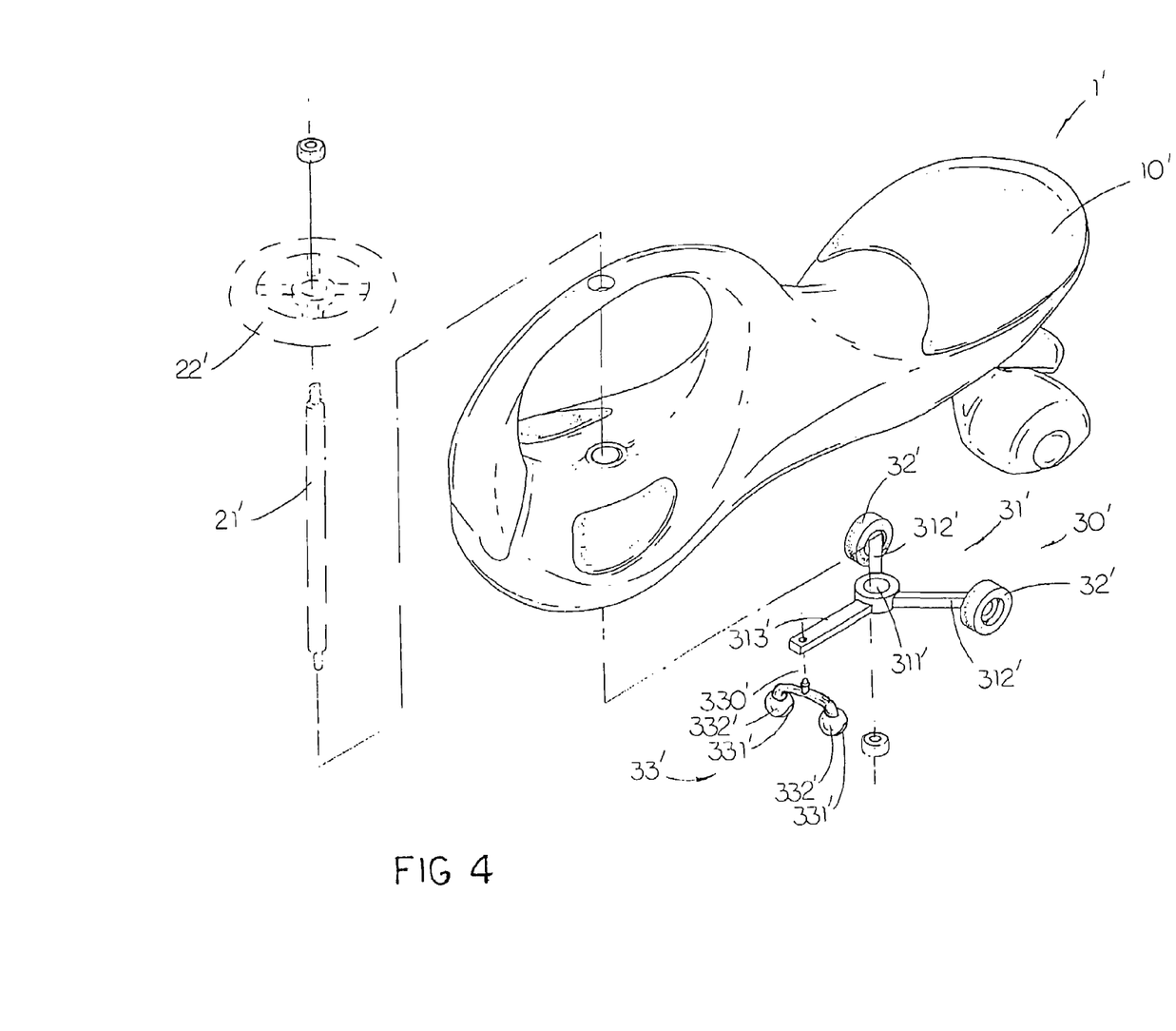
FIG. 4 is a perspective view of a twist vehicle incorporated with a safety driving arrangement according to a second preferred embodiment of the present invention.

Referring to FIG. 4 of the drawings, the twist vehicle 1' of a second embodiment illustrates an alternative mode of the first embodiment of the present invention, wherein the configuration of the twist vehicle 1' of the second embodiment is the same as that of the first embodiment, excepting the safety driving arrangement 30'.

Figure 5:
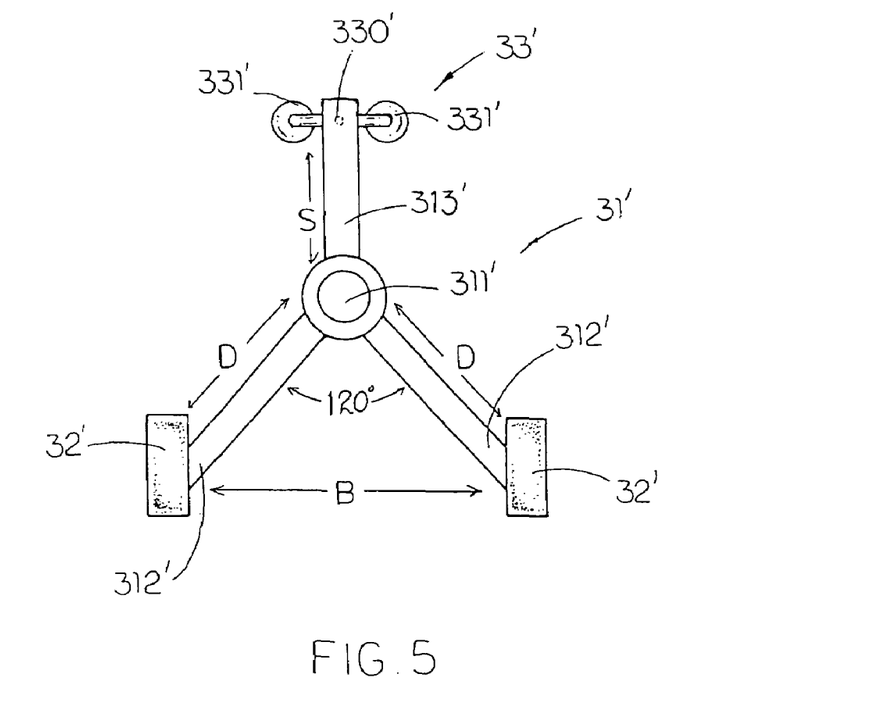
FIG. 5 is a schematic diagram of the twisting member according to the above second preferred embodiment of the present invention

As shown in FIGS. 4 and 5, the safety driving arrangement 30' comprises a twisting member 31' comprising a central hub 311' connected to the driving portion of the transmission member 21', two wheel shafts 312' rearwardly and radially extended from the central hub 311' to rotatably connect the driving wheels 32' respectively, so as to define the driving distance D with a length of each of the wheel shafts 312', and a front wheel arm 313' frontwardly and radially extended from the central hub 311' to connect the safety wheel assembly 33' so as to define the safety distance S with a length of the front wheel arm 313'. Therefore, when the transmission member 21' is driven to rotate via the rotational movement of the steering member 22', the twisting member 31' is rotated accordingly about the central hub 311'. It is worth accentuating that given the geometrical structure of the twisting member 31', the center of gravity of the twisting member 31' is substantially coincident with the central hub 311' in which the transmission member 21' is mounted. Therefore, given the particular twisting member 31', maximum stability can be ensured.

The safety wheel assembly 33' comprises two front stabilizing wheels 331' spacedly mounted on the free end of the front wheel arm 313'. The safety wheel assembly 33' further comprises a wheel holder 330' rotatably mounted to the free end of the front wheel arm 313' and two wheel housings 332' radially extended from the wheel holder 330' to rotatably support the front stabilizing wheels 331' respectively, in such a manner that the front stabilizing wheels 331' are capable of turning with respect to the free end of the front wheel arm 313'.

The front stabilizing wheels 331' are suspendedly mounted at the twisting member 31' in such a manner that the front stabilizing wheels 331' are normally overhung the ground in which the twist vehicle 1' stands. Accordingly, the front stabilizing wheels 331' substantially increase the supporting area with respect to the ground and help in supporting and stabilizing the twist vehicle 1' when it is moving, especially when the twist vehicle 1' is turning around.

In order to enhance the safety feature of the twist vehicle 1', the length of the front wheel arm 313' can be substantially increased to lengthen a distance between the safety wheel assembly 33' so as to enhance the safety distance S thereof. In other words, the twist vehicle 1' does not need to alter its structural design to enhance the safety feature.

Moreover, an angle of the wheel shafts 312' with respect to the central hub 311' can be adjusted to alter the driving distance D between the driving wheels 32'. By increasing the angle of the wheel shafts 312', the driving distance D of the driving wheels 32' will be substantially increased to enhance the driving operation of the twist vehicle 1'. Preferably, the wheel shafts 312' are radially extended from the central hub 311' with the angle at least 120°, so as to lengthen the base length b between the driving wheels 32'.

It is worth mentioning that the front stabilizing wheels 331' are capable of freely rotating, i.e. 360° rotating, with respect to the front wheel arm 313' so as to maximize the flexibility of front stabilizing wheels 331' in supporting the twist vehicle 1' without affecting the normally operation thereof.

One skilled in the art should appreciate that by adding the safety wheel assembly 33' to the twisting member 31', i.e. two rotational supports to the twist vehicle 1', the chance of flipping over of the twist vehicle 1' will be substantially decreased. Specifically, the torque generated which tends to flip over the twist vehicle 1' during driving is decreased.

Figure 6:
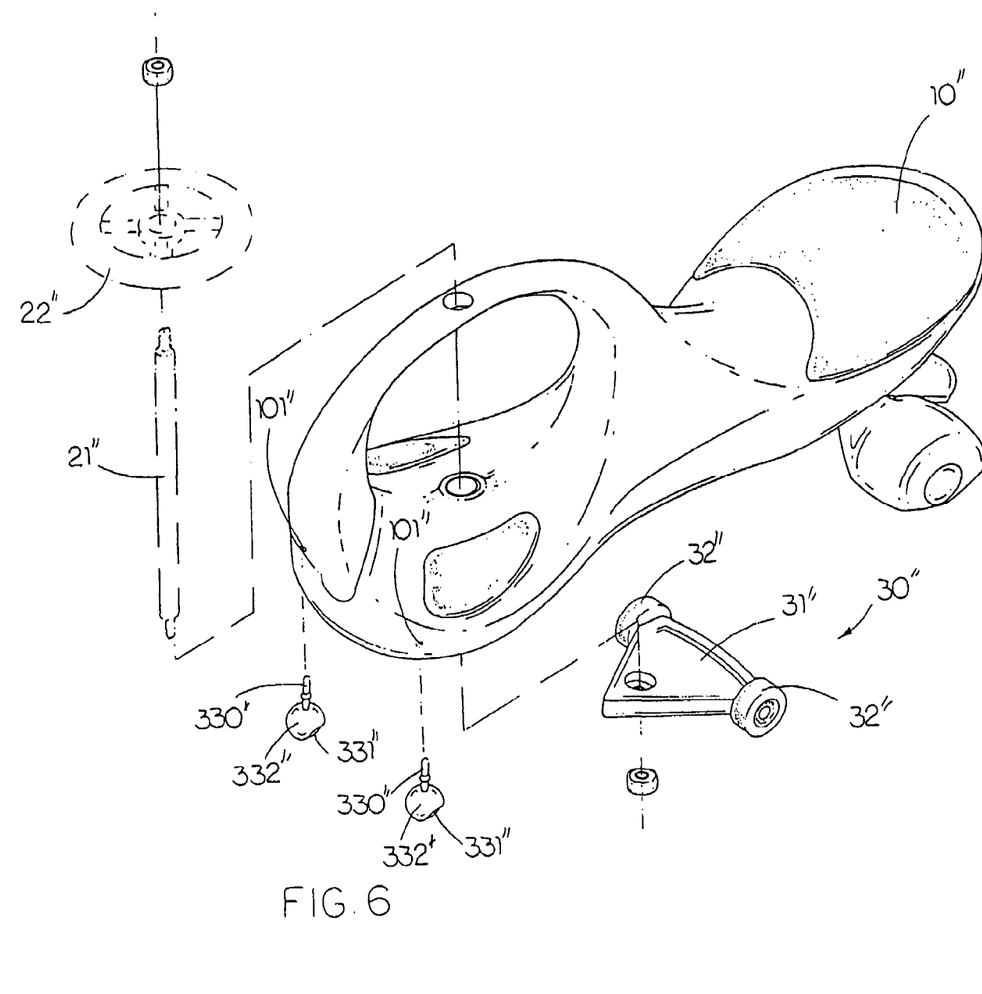
FIG. 6 is a perspective view of a twist vehicle according to a twist vehicle incorporated with a safety driving arrangement according to a third embodiment of the present invention.

As shown in FIG. 6, a twist vehicle 1" of a third embodiment illustrates another alternative mode of the present invention, wherein the configuration of the twist vehicle 1" of the third embodiment is the same as that of the first embodiment, such as the vehicle frame 10", the transmission member 21", and steering member 22" of the driving system 20", excepting the safety driving arrangement 30".

According to the third embodiment, the safety driving arrangement 30" comprises a twisting member 31" mounted to the driving portion of the transmission member 21" and two spaced apart driving wheels 32" rotatably mounted to the twisting member 31". Accordingly, the twisting member 31" can be constructed as any shape, such as a conventional triangular shape, a circular shape as embodied in the first embodiment, or V-shape as embodied in the second embodiment.

The safety driving arrangement 30" further comprises a safety wheel assembly 33" rotatably supported at the front portion of the vehicle frame 10" to prevent the twist vehicle from flipping over when the twist vehicle 1" is moving, wherein the safety wheel assembly 33" comprises at least a front stabilizing wheel 331" rotatably mounted at a bottom edge portion of the vehicle frame 10", so as to maximize the safety distance S by means of a size of the vehicle frame 10".

As shown in FIG. 6, the safety wheel assembly 33" comprises two front stabilizing wheels 331" rotatably mounted at two bottom side edge portions of the vehicle frame 10" at the front portion thereof respectively via two wheel holder 330" to define the safety distance S between each of the front stabilizing wheels 331" and the driving portion of the transmission member 21".

Accordingly, each of the wheel holders 330"; which is rotatably mounted to the respective bottom side edge portion of the vehicle frame 10" through a mounting slot 101" provided thereon, has a wheel housing 332" extended from the wheel holder 330" to rotatably support the respective front stabilizing wheels 331", in such a manner that the front stabilizing wheel 331" is capable of turning with respect to the vehicle frame 10".

Each of the front stabilizing wheels 331" is suspendedly mounted on the twisting member 31 in such a manner that the front stabilizing wheel 331" is normally overhung the ground in which the twist vehicle 1" stands, i.e. each of the front stabilizing wheel 331" does not normally touch the ground so as to normally get rid of the friction between the front stabilizing wheel 331" and the ground. In addition, the front stabilizing wheels 331" are capable of freely rotating, i.e. 360° rotating, with respect to the vehicle frame 10" so as to maximize the flexibility of front stabilizing wheels 331" in supporting the twist vehicle 1" without affecting the normally operation thereof.

In view of above, the twist vehicle can substantially enhance the operational stability thereof to provide maximum safety to the vehicle's rider without altering the original design of the twist vehicle. Moreover, the twisting member is increased its supporting surface area as compared with conventional twist vehicle to enhance the supporting strength of the twisting member for stabilization purpose.

What is claimed is:

1. A twist vehicle, comprising:

a vehicle frame;

a rear wheel assembly rotatably mounted on a rear portion of said vehicle frame;

a driving system, which comprises:

a transmission member rotatably supported by said vehicle frame wherein said transmission member has a upper control portion positioned above said vehicle frame and a lower driving portion extended underneath said vehicle frame; and a steering member which is connected to said control portion of said transmission member and arranged to drive said driving portion of said transmission member to rotate; and a safety driving arrangement, which comprises:

a twisting member, having a predetermined shape, mounted on said driving portion of said transmission member;

two spaced apart driving wheels rotatably mounted to said twisting member and defining a driving distance between each said driving wheel and said driving portion of said transmission member; in such a manner that when subsequent clockwise and anti-clockwise movements are imparted to said steering member, said two driving wheels are substantially moving forward, so as to drive said vehicle frame to move; and a safety wheel assembly rotatably supported at a front portion of said vehicle frame with a safety distance between said safety wheel assembly and said driving portion of said transmission member, so as to prevent said twist vehicle from flipping over when said twist vehicle is moving, wherein said twisting member comprises a central hub connected to said driving portion of said transmission member, two wheel shafts rearwardly and radially extended from said central hub to rotatably connect said driving wheels respectively so as to define said driving distance as a length of each of said wheel shafts, and a front wheel arm frontwardly and radially extended from said central hub to connect said safety wheel assembly so as to define said safety distance with a length of said front wheel arm.

2. The twist vehicle, as recited in claim 1, wherein said wheel shafts are radially extended said the central hub to define an angle of at least 120° between said two wheel shafts, so as to lengthen a base length between said driving wheels.

3. The twist vehicle, as recited in claim 2, wherein said safety wheel assembly comprises two front stabilizing wheels spacedly mounted to a free end of said front wheel arm at a position underneath said front portion of said vehicle frame.

4. The twist vehicle, as recited in claim 3, wherein said safety wheel assembly further comprises a wheel holder rotatably mounted to said free end of said front wheel arm and two wheel housings radially extended from said wheel holder to rotatably support said front stabilizing wheels respectively, in such a manner that said front stabilizing wheels are capable of turning with respect to said free end of said front wheel arm.

5. The twist vehicle, as recited in claim 4, wherein said safety wheel assembly is suspendedly mounted at said twisting member in a freely rotatable manner, so as to minimize a friction of said front stabilizing wheel with respect to the ground while said twist vehicle is moving.

6. The twist vehicle, as recited in claim 3, wherein said safety wheel assembly is suspendedly mounted at said twisting member in a freely rotatable manner, so as to minimize a friction of said front stabilizing wheel with respect to the ground while said twist vehicle is moving.

7. The twist vehicle, as recited in claim 1, wherein said safety wheel assembly comprises two front stabilizing wheels spacedly mounted to a free end of said front wheel arm at a position underneath said front portion of said vehicle frame.

8. The twist vehicle, as recited in claim 7, wherein said safety wheel assembly further comprises a wheel holder rotatably mounted to said free end of said front wheel arm and two wheel housings radially extended from said wheel holder to rotatably support said front stabilizing wheels respectively, in such a manner that said front stabilizing wheels are capable of turning with respect to said free end of said front wheel arm.

9. The twist vehicle, as recited in claim 7, wherein said safety wheel assembly is suspendedly mounted at said twisting member in a freely rotatable manner, so as to minimize a friction of said front stabilizing wheel with respect to the ground while said twist vehicle is moving.

10. The twist vehicle, as recited in claim 1, wherein said safety wheel assembly is suspendedly mounted at said twisting member in a freely rotatable manner, so as to minimize a friction of said front stabilizing wheel with respect to the ground while said twist vehicle is moving.

* * * * *